United States Patent Office 3,441,501
Patented Apr. 29, 1969

3,441,501
WATER REMOVAL FROM WATER-CONTAINING MEDIA
Jeane Segall and Leonard M. Shorr, Haifa, Israel, assignors to American Metal Climax, Inc., New York, N.Y., a corporation of New York
No Drawing. Filed Sept. 6, 1966, Ser. No. 577,125
Claims priority, application Israel, Sept. 14, 1965, 24,318, 24,319
Int. Cl. C02c 5/02; B01d 17/00; C02b 1/18
U.S. Cl. 210—23                                    8 Claims

ABSTRACT OF THE DISCLOSURE

Process for the selective removal of water using a hydrophilic polymerized resin having a polyolefin polymer component and a phosphorous-containing component such as phosphoric acid, phosphorous acid and metal and ammonia salts of those acids wherein the metal has a valence from 1 to 4. The components are linked together by a bond of the —P—C— or of the —P—O—C— type.

---

The present invention relates to water removal from various water-containing mixtures or media and, more particularly, to the selective water removal from such media utilizing special organic materials.

The media from which water is removed contemplated by the present invention includes water-containing liquid, solid or gaseous mixtures such as aqueous solutions, suspensions or emulsions, solid, water-containing inorganic or organic matter, water-containing organic solvents, moist gases and the like. The term "selective" used in the present specification in connection with water removal signifies that, irrespective of the nature of the remaining components, it is only water that is removed while all other components are left behind.

The selective water removal from water-containing mixtures can have various purposes. For example, where the mixture from which water is to be removed selectively is a saline aqueous solution, the object may be the production of desalinated water. In the case of solid, water-containing organic or inorganic matter, the object of the water removal may be to obtain said solid matter in a dry state. In this case, the dehydrated solid matter would be the product while the water obtained in this manner may only be of secondary importance. In still other cases, e.g., of a natural juice, the object of the water removal in all probability would be the concentration of the juice so that the desired product is a concentrate. In yet other cases, e.g., where in an industrial process a mixture of water and an organic solvent or solvents is obtained, the object of the water removal would be a separate recovery of both the water and the solvent in order to recycle both of them. In such a case, the products are both the water and the solvent and this may be of importance for example in industrial plants operating in sites where water is scarce. There are of course many other applications of selective water removal from water-containing mixtures, including aqueous solutions, and the above instances are merely cited by way of example and are not to be considered in any way as exhaustive as those skilled in the are will readily understand.

Heretofore, the art has endeavored to provide means for selectively removing water from such media but, in general, these attempts have not been completely acceptable for all purposes or under all circumstances and conditions. For example, evaporation and subsequent condensation is a well-known method for removing water but this system is disadvantageous particularly where power is expensive because of the high energy requirements.

Other means attempted by the art include the use of ion-exchange resins which, as is well known, removes ions (not water) from the media. The difficulty with this process is that it is a tedious operation requiring many manipulations and the expenditure of chemicals.

Still other resins (which are not necessarily ion-exchange resins) have been used by the prior art in order to effect a selective water removal from water-containing media but, like the foregoing means, they too suffer from certain shortcomings. For example, some of the prior art resins do not have the capacity to remove water and water only from such media where the media contains a plurality of electrolytes. One such resin is sodium polystyrene sulfonate which contains 1% or cross-linking with divinyl benzene but this resin is not selective for only water in a brine media containing sodium sulfate as well as sodium chloride.

Although many attempts have been made to overcome the foregoing difficulties and other disadvantages, none, as far as we are aware, was entirely successful for one reason or another.

It has now been discovered that certain resins may now be provided which have the surprising capacity to economically remove water and water only from water-containing media or mixtures. Thus, this invention is based on the surprising discovery that a special group of synthetic resins is capable of selectively absorbing water by contact with solid, liquid or gaseous water-containing mixtures and of liberating the so-absorbed water upon application of comparatively little energy in a very simple manner.

It is therefore an object of this invention to provide special water-selective resins which are easily regenerated with minimum energy requirements.

Another object of the present invention is the provision of a unique process using special resins which are selective for water and water only.

Other objects and advantages will become apparent from the following description.

Generally speaking, the present invention relates to the selective removal of water from water-containing media utilizing special resins having a unique combination of ingredients. According to this invention, the water removal from such media is accomplished by contacting the media with a phosphorus-containing, substantially water-insoluble, hydrophilic resin selected from the group consisting of polyolefin and polysaccharide polymers and combinations thereof. The monomer of each of the aforementioned polymers has a phosphoric or phosphorous acid group linkage which is in the form of a —P—C— or —P—O—C— bond, e.g., phosphates, phosphites, phosphonates and phosphonites. Accordingly, the polymers are linked to a plurality of phosphoric or phosphorous acid groups in —P—O—C— or —P—C— bonds. In this connection, the phosphoric or phosphorous acid component of the resins of this invention, in addition to being linked to the polyolefin or polysaccharide groups, may include ionogenic hydrogen or may be in the form of a salt of ammonia or a metal having a valence of 1 to 4. Thus, the phosphorus group can be linked to a cation having a valence of 1 to 4. Typical representatives of monovalent cations are the alkali metals (including ammonia). The divalent cations include a wide range of metals of different groups of the Periodic Table of elements, e.g., cobalt, nickel, the alkaline earth metals including magnesium, etc. An example of a tervalent metal is aluminium, and an example of a tetravalent cation is silicon.

After contacting the water-containing media with one or more of the foregoing phosphorus-containing resins, the water is recovered, if desired, and the resin is regenerated by removal of the water therefrom in a very simple manner, e.g., by the application of mechanical pressure, by heating, by contact with a system or material whose hygroscopicity is higher than the water-retaining power of the resin, or the like. Among the materials having a high hygroscopicity are the common solvents such as methanol, ethanol, diethyl ether, etc.

The phosphorus-containing polymers of this invention include linear polymers as well as cross-linked polymers and copolymers whose monomers are either aliphatic or arylaliphatic mono-, di- or polyunsaturated hydrocarbons or hydrocarbon derivatives such as alcohols, halogenated derivatives and the like. In the case of a copolymer, only one of the polymer constituents need be a phosphorus-containing constituent as stated herein before. The other constituent or constituents may, for example, be other olefinic compounds which undergo polymerization under comparable conditions. For example, copolymers of triallyl phosphate with cobalt diallyl phosphate, styrene with sodium diallyl phosphate and methyl methacrylate with magnesium divinyl phosphite are also within the contemplation of this invention.

The foregoing process utilizing the hereinbefore mentioned phosphorus-containing resins have at least the following advantages:

(1) The phosphorus-containing hydrophilic resins of the kind indicated hereinbefore are capable of absorbing as much as three to four times their weight of water depending both on the hydrophilic properties of the resin itself and on the system from which the water is to be withdrawn. This is to be compared with the water-absorption capacity of certain prior art resins. For example, cellulose acetate can also, to some certain degree, selectively absorb water from water-containing mixtures, but the absorption capacity of this resin is only about 20% of its weight.

(2) Another important feature of this invention is that the selective water-absorbing capacity of the hydrophilic resins of this invention is not influenced by the composition of the mixture and remains, for example, the same for an aqueous solution containing a plurality of electrolytes as for a solution containing only one electrolyte.

(3) As was stated hereinbefore, the recovery of water from the resins can be effected in a very simple manner and with the expenditure of comparatively low energy, namely, by the application of mechanical pressure, by contact with a system whose hygroscopicity is higher than the water retaining power of the resin, by heating or by any other suitable method. The energy required for the liberation of water from the resin is much lower than the energy expenditure in conventional water desalination processes, which renders the present invention highly attractive economically. For example, the energy expenditure in the process of the present invention is of the order of one-tenth of the energy expenditure in a process operating on evaporation.

(4) Still another advantage of the present process for removing water from aqueous media resides not only in the lower energy requirements and the extremely simple regeneration of the resin, but also the further very substantial advantage in that it can be carried out under extremely mild conditions of temperature and pressure, thereby permitting the concentration of solutions containing temperature- and/or pressure-sensitive substances which upon concentration by conventional and/or prior art methods would deteriorate.

The foregoing advantages are obtained when the water-containing media is contacted by resins which are phosphorus-containing polysaccharide and/or polyolefin polymers linked to a plurality of phosphoric or phoscous acid groups in —P—C— or —P—O—C— bonds. Among the polysaccharide components of the hydrophilic, phosphorus-containing resins contemplated by the present invention, cellulose has proved to be particularly suitable although good results are also obtained with such polysaccharides as amylopectin and glycogen.

From among the various hydrophilic, polyolefin-type resins within the scope of the present invention, it is advantageous in the practice of this invention to use the salts of polymeric diallyl phosphates which are solid, substantially water-soluble resins and which are polymers or copolymers of monomeric metal diallyl phosphates of the formula

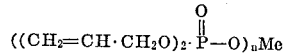

where Me is a metal or cation, e.g., ammonia, having a valence of from 1 to 4 and $n$ is an integer of from 1 to 4.

The metal or ammonia diallyl phosphate resins are substantially water insoluble, e.g., the solubility of polymeric sodium diallyl phosphate was found to be less than 0.01% by weight. In addition, they have been found to possess another property which has been quite surprising, namely, that they can absorb water selectively from brines, water-containing organic liquids, wet gases and the like, and that they can readily be freed from the absorbed water with a small expenditure of energy by various different processes, such as squeezing, heating, retransfer of the water to a solvent (extraction). This property can be used either for the dehydration of the water-containing matter or for the recovery of pure water. Polymeric cobaltous diallyl phosphate has a very interesting attribute which is useful in that it is blue when dry and is pink when contacted with moisture.

The aforementioned phosphorus-containing resins can be prepared by a free-radical initiated polymerization or copolymerization, e.g., monomeric cobaltous diallyl phosphate can be polymerized with itself or copolymerized with another monomer such as triallyl phosphate or styrene.

The polymerization can be initiated by the irradiation of the reaction mixture with ultraviolet (UV) rays or any other conventional means for producing free radicals, e.g., using benzoyl peroxide in benzene, t-butyl peroxide in xylene, hydrogen peroxide plus UV radiation, etc.

The phosphorus-containing resins applied in accordance with the present invention for the selective water removal from water-containing mixtures or media can be used in various forms. For example, it is possible to use the resins in the form of semipermeable membranes mounted on suitable carrier frames. In accordance with this embodiment, each membrane will be placed as a partition between a saline and a non-saline compartment and the phenomenon may be described as "reverse osmosis" since the membrane blocks passage of the salt but allows pure water to flow into the membrane. The energy for bringing about the desorption of the water from the membrane, and its discharge into the pure water vessel, can be supplied, for example, by putting the saline solution under a pressure that is higher than the pressure of the pure water, either continuously or intermittently. Alternatively, it is possible to apply a temperature gradient between the two vessels, rinse the pure water side of the membrane with a hydrophilic solvent, and the like.

The phosphorus-containing resins may also be applied in accordance with the invention in the form of discrete particles or pellets. After contact, the particles are separated and the water is liberated therefrom, e.g. by squeezing. In practice, the desalination of water, when employing the resins in the form of particles, is conducted in a cyclic process comprising contacting the dry resin particles with the saline solution, removing the water-saturated particles from the solution, liberating pure water from the particles and collecting the so-liberated water and returning the dry resin particles to the solution.

Where the phosphorus-containing resins are used in accordance with the invention in form of discrete particles, some saline solution may adhere to the surface, in which case the particles may preferably be washed with pure water before the liberation of the absorbed water therefrom. If desired, the particles may also be mounted on carrier materials by which their useful lifetime may be prolonged.

For the purpose of giving those skilled in the art a better understanding of the invention and a stronger appreciation of its advantages, the following illustrative examples are set forth.

EXAMPLE I

A 33%-by-weight solution of cobaltous diallyl phosphate in benzene containing 3% by weight of benzoyl peroxide as an initiator was refluxed for 12 hours under a nitrogen atmosphere, whereby polymerization was effected. The resin thus produced was washed with ethyl alcohol and dried.

Next, 0.625 gram (g.), which is equal to 3.02 milliequivalent (meq.) of counter ion, of the dry polymer was contacted at room temperature and under atmospheric pressure with 5 milliliters (ml.) of an aqueous sodium chloride (NaCl) solution containing 0.44 millimoles (mmol)/ml. of the salt. The resin was then filtered off. The filtrate contained 0.48 mmol/ml. of NaCl while 0.41 g. (22.8 mmol) of water had been absorbed by the phosphorus-containing polymer.

EXAMPLE II

Cobaltous diallyl phosphate resin which had previously absorbed water, e.g., in the manner described in Example I, was liberated from absorbed water in various ways. In all cases, the pink hydrated resin contained 25 moles of water for each metal ion equivalent of the resin:

(a) 5 ml. of methanol, containing 0.2% water, was added to 0.67 g. of the hydrated polymer. The blue dehydrated resin obtained was separated by filtration and the alcoholic filtrate was found to contain 11.5% water. It was calculated that the water desorption required approximately 0.5 kilocalorie (kcal.)/mole water.

(b) 5 ml. of ethyl alcohol containing 0.08% water was added to 0.813 g. (1.254 meq. of counter ion) of the polymer, then was filtered off. The filtrate was found to contain 11.6% water.

(c) 5 ml. of diethyl ether containing 0.2% water was added to 0.813 g. (1.254 meq. of counter ion) of the polymer, then the latter was filtered off. The filtrate was found to contain 1.2% water.

(d) Upon heating the polymer to between 50° and 60° C., its color changed from pink to blue as a result of its release of bound water.

EXAMPLE III

A 33%-by-weight aqueous solution of magnesium diallyl phosphate was refluxed with 3% hydrogen peroxide as initiator for 12 hours under a nitrogen atmosphere. The resin thus produced was washed with ethyl alcohol and dried. 0.80 g. (4.25 meq. of counter ion) of the dry polymeric Mg. diallyl phosphate was used in a water-absorbing experiment paralleling that of Example I. The salt concentration of the filtrate increased to 0.65 mmol/ml.

EXAMPLE IV

Sodium diallyl phosphate was refluxed in a xylene solution containing tertiary butyl peroxide as initiator, the process being performed similarly as described in Example I. The following water-absorbing tests were then made with the dried resin:

(a) First, 1.03 g. (5.15 meq. of counter ion) of the polymer was contacted at room temperature and under atmospheric pressure with 5.0 ml. of an aqueous NaCl solution containing 0.44 mmol/ml. of the salt. The resin was filtered off, the filtrate contained 0.6 mmol/ml. of the salt.

(b) In the next test, 0.53 mmol/ml. of NaCl solution in water was passed through a bed of 0.5 g. of particulate, dry polymeric Na diallyl phosphate pressed into the form of a porous pellet. The affluent brine solution was concentrated to 0.73 mmol/ml. of the salt.

(c) One-gram portions of the dry polymeric sodium diallyl phosphate resin were contacted with 5 ml. portions of NaCl brines of various concentrations at room temperature and under atmospheric pressure. The hydration levels were recorded in Table I.

Table I

| Concentration of NaCl brine (mmol/ml.) | Degree of hydration (mole water/eq. resin) |
|---|---|
| 0.08 | 17.5 |
| 0.40 | 12.5 |
| 1.60 | 5.2 |
| 2.80 | 2.5 |

EXAMPLE V

Various water release experiments were performed with sodium diallyl phosphate polymer resin which had previously absorbed water:

(a) 5 ml. of methanol containing 0.08% water was added to 0.928 g. (0.995 meq. of counter ion) of wet polymer containing 42 moles $H_2O$/metal ion equivalent of resin. After filtration, the filtrate obtained was found to contain 15.6% water. From this the desorption energy was calculated to be approximately 0.5 kcal./mole water. (The energy required to release water from the hydrated form of 1% cross-linked sodium polystyrene sulfonate resin is approximately 5 kcal./mole water or 10 times as much).

(b) 1.07 g. of the wet polymer containing 0.8 g. water was placed in a pellet press and subjected to pressure up to approximately 1,000 atmospheres at room temperature. 25% of the water originally bound was thereby squeezed out.

(c) The experiment (b) was repeated at 60° C. whereby water was expressed from the resin at pressures as low as 20 atmospheres.

EXAMPLE VI

The polymers used in Examples I, III and IV were subjected to moist air having a temperature between 20° and 25° C. and their weight increase resulting from water absorption was measured by means of a McBain balance. The results obtained are set forth in Table II.

TABLE II

| Polymer | Weight increase, percent | Time, hrs. |
|---|---|---|
| Cobalt Diallyl Phosphate | 72 | 4.5 |
| Magnesium Diallyl Phosphate | 83 | 6.5 |
| Sodium Diallyl Phosphate | 230 | 16 |

EXAMPLE VII 5 ml. of a sea-water brine containing 0.532 meq. Cl$^-$/ml. was contacted with 0.6648 g. of dry polymeric sodium diallyl phosphate (prepared as in Example IV). After 30 minutes the resin was filtered off and the filtrate was found to have been concentrated to 0.610 meq. Cl$^-$/ml. The wet polymer was then mixed with 5 ml. of hexylcarbitol at 5° C. Upon warming the carbitol solution to 60° C., an aqueous phase containing 0.330 meq. Cl$^-$/ml. water separated. The salt concentration of this separated aqueous phase had decreased 38% with respect to the original solution.

EXAMPLE VIII 0.4848 g. of dry polymeric sodium diallyl phosphate prepared as in Example IV was mixed with 5 ml. of a brine containing 0.278 mmol/ml. of NaCl and 0.019 mmol/ml. of sodium sulfate ($Na_2SO_4$) at room temperature and under atmospheric pressure. The resin was filtered off, the filtrate contained 0.313 mmol/ml. NaCl and 0.123 mmol/ml. $Na_2SO_4$. Calculated on the basis of either the $Cl^-$ concentration change or that of the $SO_4^=$ ion, 0.55 g. of pure water had been absorbed.

With a 0.6321 g. portion of the same dry resin, and basing the calculation on either of the anions, 0.71 g. of pure water was absorbed. This resin is therefore equally selective towards water with respect to both NaCl and $Na_2SO_4$. A similar result was achieved if the resin prepared from magnesium diallyl phosphate (Example III) was used.

EXAMPLE IX

A 0.9350 g. sample of a copolymer of cobalt diallyl phosphate and triallyl phosphate in a molar ratio of 9 to 1 (prepared by copolymerizing cobalt diallyl phosphate and triallyl phosphate in a manner similar to that described in Example I) was contacted with 5 ml. of 0.44 mmol/ml. NaCl solution. The filtrate obtained had a concentration of 0.5 mmol/ml. NaCl.

EXAMPLE X 1.0667 g. of a copolymer similar to that of Example IX but produced from equimolar amounts of the monomers increased the concentration of NaCl in 5 ml. of brine from 0.46 to 0.5 mmol/ml.

EXAMPLE XI 0.2410 g. of polymeric sodium diallyl phosphate in powder form (prepared as described in Example IV) was mixed with 5 ml. of a chloroform solution containing 30% polystyrene. A heterogeneous film cast from this mixture increased the concentration of 2 ml. of a 0.53 mmol/ml. NaCl solution to 0.567 mmol/ml. upon contact.

EXAMPLE XII 1.4295 g. of dry polymeric sodium diallyl phosphate was contacted with 10 ml. of a brine containing 0.46 meq. $Cl^-$/ml. The concentration of the brine increased to 0.53 meq./ml. in the resultant filtrate (10.3 moles water per equivalent of polymer). The wet resin was washed free of salt, dried and 0.4098 g. of the recovered resin was retreated with 5 ml. of the same brine solution. The $Cl^-$ concentration of the resultant filtrate was 0.495 meq./ml., corresponding to a water absorption level of 9.5 mole per polymer equivalent.

EXAMPLE XIII

Five different resins A–E were tested for their selective water absorptivity. The resins were prepared as follows:

(A) A vinyl alcohol-vinyl acetate copolymer (obtained by partial hydrolysis of polyvinyl acetate) was refluxed with an excess (110 g. per equivalent of OH) of ethyl polyphosphate in ethyl ether for 60 hours and the resin was neutralized with ferrous carbonate (58 g. per equivalent of OH).

(B) 82 g. of diethyl vinyl phosphonate was copolymerized with 42 g. of styrene and the resin was heated with $MgCl_2 \cdot 6H_2O$ (24 g. of $MgCl_2$) at 120° C. for 4 hours.

(C) 80 g. of methyl allylphenylphosphonate was copolymerized with 20 g. of methyl methacrylate and the resin was heated with $CaCl_2$ (22 g. per 100 g. resin) at 80° C. for 3 hours.

(D) 75 g. of nickel vinylethyl phosphite was copolymerized with 25 g. of methyl methacrylate.

(E) 132 g. of polymeric divinyl methylphosphonite was heated with 86 g. of LiBr at 100° C. for 5 hours.

The water absorptivity of these resins was determined in the following manner:

One-half gram samples of the dry resins in powder form were contacted each with 5.0 ml. of sea water brine containing 0.48 meq. $Cl^-$/ml. and removed by filtration after one hour contact periods at room temperature. The filtrates had the concentrations set forth in Table III.

Table III

| Resin: | Final $Cl^-$ concentration (meq./ml.) |
|---|---|
| A | 0.54 |
| B | 0.50 |
| C | 0.56 |
| D | 0.53 |
| E | 0.55 |

The ratio of $Cl^-:SO_4^=:CO_3^=$ remained essentially unchanged in each case. The water bound to each of these resins is easily removed by contact with anhydrous methyl alcohol.

EXAMPLE XIV 0.707 g. of dry sodium polystyrene phosphonate was contacted at room temperature with 5 ml. of a brine containing 0.256 mmol/ml. of NaCl and 0.117 mmol/ml. of $Na_2SO_4$. After filtration, the filtrate contained 0.3 mmol/ml. of NaCl and 0.142 mmol/ml. of $Na_2SO_4$, indicating that the resin had removed 66 mmol water/g. dry resin (based on NaCl concentration) or 66.7 mmol water/g. dry resin (based on $Na_2SO_4$ concentration).

EXAMPLE XV 14.2 g. (0.1 mole) of phosphorous pentoxide was refluxed in 50 ml. of chloroform for 24 hours with 50 ml. dry ethyl ether. The obtained ethyl polyphosphate was stripped of the residual solvents and mixed with 16.2 g. (0.1 mole of glucose unit) of cellulose. The mixture was thoroughly stirred and heated at 120° C. in a nitrogen atmosphere for 30 hours, then quenched in water and neutralized with 11 g. of sodium carbonate. The obtained sodium salt of ethyl cellulose phosphate was washed with water and dried at 80° C. under reduced pressure.

4.9609 g. of the dry sodium ethyl cellulose phosphate polymer was contacted at room temperature with 20 ml. of a brine containing 0.194 mmol/ml. of NaCl. After filtration, the concentration of the filtrate had increased to 0.211 mmol/ml. of NaCl, which corresponded to the absorption of 17.4 mmol of water/g. dry polymer.

The present invention, as was mentioned hereinbefore, can be used in the removal of water from a variety of water-containing mixtures, whether solid, liquid or gaseous, but it is not to be confused with processes wherein an ion-exchange resin is used. For example, it can advantageously be employed in the production of desalinated water from brine and other saline solutions particularly in a reverse osmosis process. Another important application of the present invention is utilization of this process in the concentration of liquid solutions, e.g., a natural juice. Moreover, it can also be used in the drying of gaseous, liquid or solid materials which contain water but which are basically non-liquid. Because of the economical nature of this invention, there are of course many other applications in which it can be used such as recovering a solvent used in a chemical process from solvent-water solutions. In such a situation, the dried solvent would merely be recycled back into the process.

Although the present invention has been described in conjunction with preferred embodiments, it is to be understood that modifications and variations may be resorted to without departing from the spirit and scope of the invention as those skilled in the art will readily understand. Such modifications and variations are considered to be within the spirit and scope of the invention and the appended claims.

What is claimed is:

1. A process for the selective removal of water from water-containing media which comprises contacting said media with a phosphorous-containing, substantially water-insoluble, hydrophilic, polymerized resin having a polyolefin polymer component and a phosphorus-containing component selected from the group consisting of phosphoric acid, phosphorous acid and metal and ammonia salts of said acids wherein the metal has a valence from 1 to 4, said components, being linked to each other by a bond selected from the group consisting of —P—C— and —P—O—C— bonds, absorbing water and substantially water only in said resin and liberating the absorbed water from the resin.

2. A process as claimed in claim 1 wherein the resin was formed from a monomeric diallyl phosphate having the formula

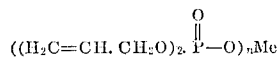

where Me is a cation selected from the group consisting of ammonia and metals having a valence of from 1 to 4 and $n$ is an integer of from 1 to 4.

3. A process as claimed in claim 2 where Me is a cation selected from the group consisting of sodium, magnesium and cobalt.

4. A process as claimed in claim 2 wherein the process is a reverse osmosis process and the resin is in the form of a porous membrane.

5. A process as claimed in claim 2 wherein the absorbed water is liberated from the resin by the application of heat.

6. A process as claimed in claim 2 wherein the absorbed water is liberated from the resin by the application of mechanical pressure.

7. A process as claimed in claim 2 wherein the absorbed water is liberated from the resin by contacting said water-containing resin with a material having an hygroscopicity higher than the water-retaining power of the resin.

8. A process as claimed in claim 2 wherein the water-containing media is salt water.

References Cited

UNITED STATES PATENTS

| | | | |
|---|---|---|---|
| 3,234,125 | 2/1966 | Bloch | 210—59 |
| 3,234,126 | 2/1966 | Bloch | 210—59 |

MICHAEL E. ROGERS, *Primary Examiner.*

U.S. Cl. X.R.

55—33; 210—59; 252—194

U.S. DEPARTMENT OF COMMERCE

PATENT OFFICE

Washington, D.C. 20231

UNITED STATES PATENT OFFICE
CERTIFICATE OF CORRECTION

Patent No. 3,441,501                               April 29, 1969

Jeane Segall et al.

It is certified that error appears in the above identified patent and that said Letters Patent are hereby corrected as shown below:

In the specification:

Column 2, line 14, "or" should read -- of --. Column 4, line 5, "water-soluble" should read -- water-insoluble --. Column 6, line 72, "0.019" should read -- 0.109 --.

Signed and sealed this 2nd day of September 1969.

(SEAL)
Attest:

Edward M. Fletcher, Jr.                        WILLIAM E. SCHUYLER, JR.
Attesting Officer                                    Commissioner of Patents